March 1, 1966  G. K. BENSING  3,238,388
DIFFERENCE SWITCHING
Filed Feb. 8, 1962
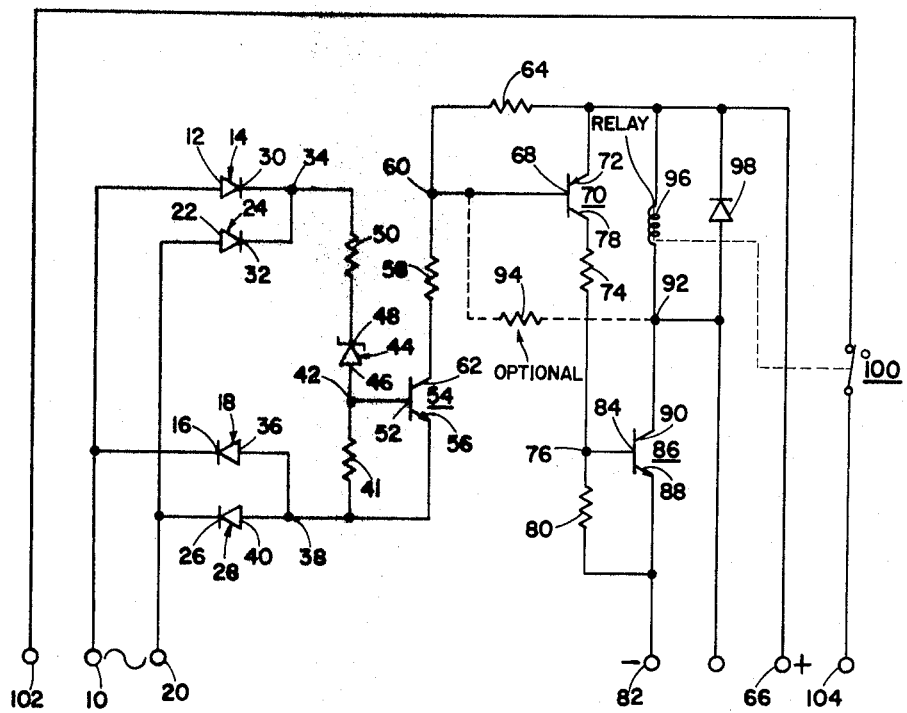
INVENTOR.
GERALD K. BENSING
BY Roger W. Jensen
ATTORNEY.

United States Patent Office 3,238,388
Patented Mar. 1, 1966

3,238,388
DIFFERENCE SWITCHING
Gerald K. Bensing, Minneapolis, Minn., assignor to
Honeywell Inc., a corporation of Delaware
Filed Feb. 8, 1962, Ser. No. 171,912
1 Claim. (Cl. 307—88.5)

This invention pertains generally to switching circuits and more particularly to a circuit which switches from one state to another when two input signals vary by more than a predetermined amount one with respect to the other. Alternatively, the circuit can be used with one signal varying by more than a predetermined amount on either side of a ground or reference potential.

As described later in the specification, an input signal or the higher voltage of two input signals is passed through a full-wave rectifier bridge and applied across a series load comprising a zener diode and in impedance means. When the rectified signal becomes larger than the breakdown voltage of the zener diode, current is passed through the zener diode to build up a voltage across the impedance means. As the voltage across this impedance means becomes larger, it turns on a transistor which, with a large enough amount of conduction, switches a high gain amplifier or Schmitt-trigger type of circuit to an ON condition and thus controls a relay which can be used to provide a warning signal, a warning light, or provide some other safety action such as switching another circuit to an OFF condition. This Schmitt-trigger type circuit can be easily converted to a latching type circuit so that it will stay in this condition, even though the input signals are reduced in magnitude one relative to the other, until the power to the latching circuit is interrupted. Latching as applied to this invention is defined as, "keeping a circuit in a given condition until the power to the circuit is interrupted." This latching action provides an indication that something has gone wrong, even though it would not be indicated by the present signals being applied to the circuit.

It is an object of this invention to provide a circuit which will detect failure of one of two signals being monitored.

It is a further object of this invention to provide a circuit for giving a warning when one of two signals being monitored deviates more than a predetermined amount from the second signal being monitored.

It is still another object of this invention to provide a circuit which will continue to give a fault indication after the signals showing malfunctions have been removed.

Further objects of this invention will be apparent from a reading of the specification and claim along with the single figure which illustrates the circuitry involved in one embodiment of the invention.

A terminal means 10 is connected to an anode 12 of a rectifier or diode means 14 and also to a cathode 16 of a rectifier or diode means 18. A second terminal means 20 is connected to an anode 22 of a diode or rectifier means 24 and also to a cathode 26 of a rectifier or diode means 28. A cathode 30 of the rectifier means 14 is connected to a cathode 32 of the rectifier 24 and also to a junction point 34. In describing this invention, the direction of easy current flow by definition in this specification is current flow from the anode to the cathode of the various rectifiers or diodes. This then is the conventional definition of current flow and not the definition of electron flow. An anode lead 36 of the rectifier means 18 is connected to a junction point 38 and also to an anode 40 of the rectifier means 28. An impedance means or resistance means 41 is connected between the junction point 38 and a junction point 42. A zener diode means, voltage reference means, semiconductor element, or reference potential means 44 has an anode 46 connected to the junction point 42 and has a cathode 48 connected to one end of a resistance or impedance means 50. The other end of the resistance means 50 is connected to junction point 34. A base 52 of an NPN transistor means or electric valve means 54 is connected to the junction point 42. An emitter 56 of the transistor means 54 is connected to the junction point 38. An impedance means or resistance means 58 is connected between a junction point 60 and a collector 62 of the transistor means 54. Another impedance means or resistance means 64 is connected between the junction point 60 and a positive power terminal means 66. A base 68 of a PNP transistor means or electric valve means 70 is connected to the junction point 60. An emitter 72 of the transistor means 70 is connected to the positive power terminal 66. A resistance or impedance means 74 is connected between a junction point 76 and a collector 78 of the transistor 70. An impedance means or resistor means 80 is connected between the junction point 76 and a ground or reference terminal means 82. A source of power (not shown) would be connected between terminal means 66 and 82. While 82 only need be negative with respect to 66, it can be at a potential which is negative with respect to an arbitrary ground or reference potential. A base 84 of an NPN transistor or electric valve means 86 is connected to the junction point 76. An emitter 88 of the transistor 86 is connected to the reference potential terminal 82. A collector 90 of the transistor 86 is connected to a junction point 92 and to one lead of an impedance or resistor means 94 which has its other lead connected to the junction point 60. A relay means or switching means 96 is connected between the junction points or terminal means 66 and 92. A diode or rectifier means 98 is connected across the relay coil means 96 with an anode connected to terminal point 66 and a cathode connected to junction point 92. The relay coil 96 controls a switch contact or relay contact represented in the drawing by switch 100. Terminal means 102 and 104 are connected to opposite contacts of the switch 100. The line or wires between terminal means 102 and 104 represent the circuit means which is being controlled by the relay or switching means 96.

The four diodes or rectifiers 14, 18, 24, and 28 are connected to form a bridge circuit rectifier or rectifying means. The three transistors involved in the figure constitute a switching circuit which controls the switching means 96. The switching means 96 in turn operates the switch contact 100. When the resistor 94 is utilized in the circuit, the circuit in combination with the switch or relay 96 can be termed a latching type switching means.

Two embodiments of this invention are shown. The first to be described is the non-latching type circuit resulting if resistor 94 is removed. The second embodiment to be described is the latching type circuit shown in the figure.

On operation, as long as the signals applied to terminals 10 and 20 are less than a predetermined difference, nothing will happen in the output portion of the circuit. It may be assumed that the potential of terminal 10 rises in respect to that applied to terminal 20. The two signals may be floating or one terminal such as 20 may be connected to a reference or ground potential. If the signals being monitored are of an alternating characteristic, they will be rectified by the full wave bridge rectifier circuit. If the potentials are slowly varying or direct potentials the voltage applied to 10 have to rise with respect to that applied to terminal 20 until the difference is greater than the breakdown voltage of the zener diode 44. When the difference in applied voltage is greater than the breakdown voltage of zener diode 44, current will flow through diode 14, impedance means 50, diode element 44, impedance means 41, diode element 28, and back to the source of the other voltage applied to terminal means 20. Initially, the current flow through impedance means 41 will not produce a great enough voltage drop to turn the transistor 54 to an ON condition. However, as soon as the voltage drop from junction point 42 to 38 becomes greater than the forward voltage drop from base to emitter of the transistor 54, the transistor 54 will start conduction. As the voltage at terminal 10 increases with respect to that applied to terminal 20, the transistor 54 will conduct enough current so that a proper voltage drop appears across impedance 64 to turn the transistor 70 to an ON condition. Current flow through transistor 70 produces a voltage drop across the impedance 86 and thereby turns transistor 80, which would be a transistor of power capabilities adequate to operate the relay 96, to an ON condition. When transistor 86 conducts sufficiently, the relay coil 96 will operate the switch contacts 100 to a second condition. This condition, which is open for this application, will disconnect another circuit or produce a warning in some manner to indicate that a malfunction exists.

If it is desired that the condition providing a warning of malfunction remain after the voltage at terminal 10 falls below the switching voltage for which the circuit is designed, the resistance means 94 is inserted as shown connected by dashed lines in the circuit diagram. With the resistor 94 in the circuit the negative or ground potential, present at junction point 92 when the transistor 86 is turned to an ON condition, is applied back through the resistor 94 to lower the potential at junction point 60. By keeping the junction point 92 at a value near ground potential, the transistor 70 is kept in an ON condition due to current flow from the positive power potential terminal through the path from emitter 72, base 68, resistor 94, transistor 86 to ground potential 82. This condition remains even though transistor 54 may turn to an OFF condition and cease to require current flow through the resistor 64. To reset the circuit, the power applied to terminal 66 has to be interrupted so that the original circuit conditions can be re-established. If the terminal means 10 is negative with respect to terminal 20 and if it be further assumed that direct potentials are being applied, there will be a point at which a large enough difference in potential will result to provide current flow from terminal means 20 through diode 24, resistance 50, diode 44, resistance 41, diode 18, to the junction or terminal means 10. When the current flow through resistance 40 is large enough to turn the transistor 54 to an ON condition, the same results as above described will occur.

It can thus be determined that the circuit will operate whether the terminals 10 and 20 are negative or positive, one with respect to the other. If the signals applied to terminals 10 and 20 are alternating voltages and in phase with one another, the operation will be very similar to that obtained if direct voltages were utilized. If only one signal is used and the other terminal is connected to ground or reference potential the circuit will operate when the peak amplitude of the signal being monitored is larger than the predetermined amount.

If there is a possibility that in the event the two signals being monitored become out of phase, that malfunction or damage to other components can occur, this circuit can provide an indication when the two voltages are enough out of phase to produce a difference in potential between terminal means 10 and 20 to thereby break down the zener diode 44 and operate the warning relay.

Operation utilizing the opposite polarity power supply will involve only the change of PNP transistors where NPN transistors are presently used and vice versa along with a reversal of connection of each of the various diodes and the zener diode.

While only two embodiments of the invention have been shown, it is understood that various modifications may be utilized, some of which are mentioned above and still fall within the invention described herein and further that it is the intention of the applicant to be limited only by the scope of the claim attached hereto.

I claim:

In voltage differential sensing apparatus:
switching means;
first and second terminal means;
ground terminal means;
signal rectifying means including input and output means, said input means of said signal rectifying means being connected between said first and said second terminal means;
zener diode means and first resistance means connected in series relationship across said output means of said signal rectifying means;
first NPN transistor means including base, emitter and collector, said first NPN transistor means being connected by said base and emitter to receive a signal from across said first resistance means;
power terminal means connected to said switching means;
second resistance means connected between said power terminal means and said collector of said first NPN transistor means;
PNP transistor means including base, emitter and collector, said emitter of said PNP transistor means being connected to said power terminal and said base of said PNP transistor means being connected to said collector of said first NPN transistor means;
third resistance means connected between said ground terminal means and said collector of said PNP transistor means;
second NPN transistor means including base, emitter and collector, said emitter of said second NPN transistor means being connected to said ground terminal means, said base of said second NPN transistor means being connected to said collector of said PNP transistor means, and said collector of said second NPN transistor means being connected to said switching means;
and fourth resistance means connected between said collector of said second NPN transistor means and said base of said PNP transistor means.

References Cited by the Examiner

UNITED STATES PATENTS

| | | | |
|---|---|---|---|
| 2,845,581 | 7/1958 | Hodges et al. | 317—36 |
| 2,866,106 | 12/1958 | Schuh | 307—88.5 |
| 2,875,382 | 2/1959 | Sandin et al. | 317—36 |
| 2,904,742 | 9/1959 | Chase | 307—88.5 |
| 2,920,242 | 1/1960 | Koss | 317—32 X |
| 2,977,510 | 3/1961 | Adamson et al. | 317—36 |
| 2,983,851 | 5/1961 | Hodges | 317—36 |
| 2,992,340 | 7/1961 | Floyd | 307—88.5 |
| 3,018,416 | 1/1962 | Karlicek et al. | 317—36 |
| 3,041,469 | 6/1962 | Ross | 307—88.5 |
| 3,069,672 | 12/1962 | Rau | 307—88.5 X |
| 3,105,920 | 10/1963 | Dewey | 307—88.5 X |
| 3,116,439 | 12/1963 | Riebs | 307—88.5 X |
| 3,127,542 | 3/1964 | Riebs | 317—36 X |
| 3,139,562 | 6/1964 | Freeborn | 307—88.5 X |
| 3,155,879 | 11/1964 | Casey et al. | 307—88.5 X |

OTHER REFERENCES

Silicon Zener Diode and Rectifier Handbook, Semiconductor Products Div., Motorola Inc., copyright 1961, second edition (page 55 relied upon).

ARTHUR GAUSS, *Primary Examiner.*

J. JORDAN, *Assistant Examiner.*